(12) United States Patent
Maeda

(10) Patent No.: US 9,434,316 B2
(45) Date of Patent: Sep. 6, 2016

(54) VEHICLE REAR VIEW CAMERA CONNECTING CABLE

(71) Applicant: Philip Maeda, Torrance, CA (US)

(72) Inventor: Philip Maeda, Torrance, CA (US)

( * ) Notice: Subject to any disclaimer, the term of this patent is extended or adjusted under 35 U.S.C. 154(b) by 0 days.

(21) Appl. No.: 14/494,864

(22) Filed: Sep. 24, 2014

(65) Prior Publication Data

US 2016/0082906 A1    Mar. 24, 2016

(51) Int. Cl.
*B60R 16/03*   (2006.01)
*B60R 1/12*    (2006.01)
*H01R 107/00*  (2006.01)

(52) U.S. Cl.
CPC .......... *B60R 1/12* (2013.01); *B60R 2001/1215* (2013.01); *H01R 2107/00* (2013.01); *H01R 2201/26* (2013.01)

(58) Field of Classification Search
CPC   H01R 25/003; H01R 31/06; H01R 2201/26; H01R 31/02; B60R 16/0207; B60R 16/03; B60R 16/023
USPC .......................................... 348/E07.085, 148
See application file for complete search history.

(56) References Cited

U.S. PATENT DOCUMENTS

| | | | |
|---|---|---|---|
| 5,572,348 A * | 11/1996 | Carlson | H04M 3/30 379/413.02 |
| 6,790,094 B1 * | 9/2004 | Bergmann | G09G 5/006 439/653 |
| 7,001,201 B1 * | 2/2006 | Peng | H01R 13/6275 439/358 |
| 8,002,560 B2 * | 8/2011 | Arie | G11B 31/02 439/120 |
| 8,109,792 B2 * | 2/2012 | Briano | G09G 5/006 439/502 |
| 8,325,759 B2 * | 12/2012 | Hazani | H04L 5/06 340/12.32 |
| 8,957,941 B2 * | 2/2015 | Shoemake | H04N 7/15 307/44 |
| 2003/0064624 A1 * | 4/2003 | Rus | H01R 13/5224 439/537 |
| 2003/0216069 A1 * | 11/2003 | Huang | G06F 13/409 439/105 |
| 2006/0154530 A1 * | 7/2006 | Novotney | H01R 27/00 439/660 |
| 2007/0099466 A1 * | 5/2007 | Gushiken | G06F 1/266 439/188 |
| 2009/0104811 A1 * | 4/2009 | Sumida | H01R 13/72 439/501 |
| 2012/0028488 A1 * | 2/2012 | Puschnigg | G06F 1/266 439/189 |
| 2013/0054848 A1 * | 2/2013 | Huang | H01R 13/7175 710/72 |
| 2013/0084742 A1 * | 4/2013 | Wang | H01R 13/6658 439/607.28 |
| 2014/0170907 A1 * | 6/2014 | Golko | H01R 13/516 439/676 |

* cited by examiner

*Primary Examiner* — Gary Paumen
(74) *Attorney, Agent, or Firm* — Irving Keschner

(57) ABSTRACT

A cable including a connector for connecting a vehicle rearview mirror monitor or a vehicle dashboard monitor to a camera connected to the rear of the vehicle. The cable has a smaller diameter than those currently available and includes wires for controlling a number of vehicle functions. A single cable wire provides both power and video signals to the monitor.

4 Claims, 5 Drawing Sheets

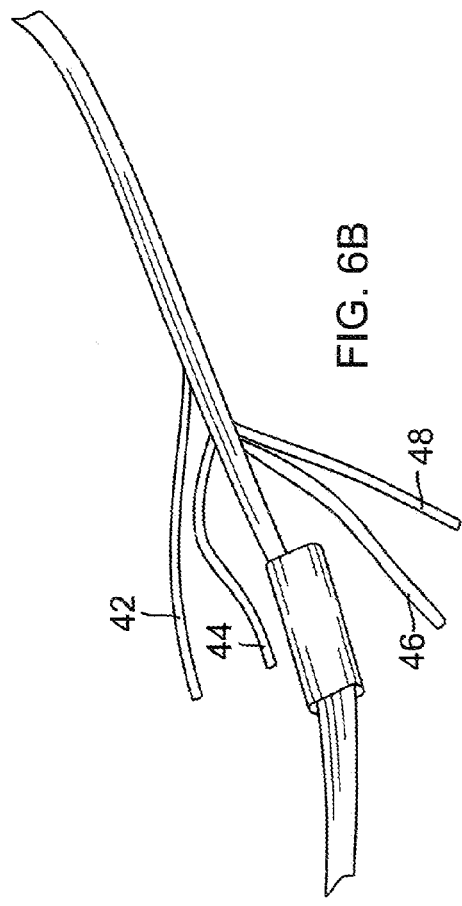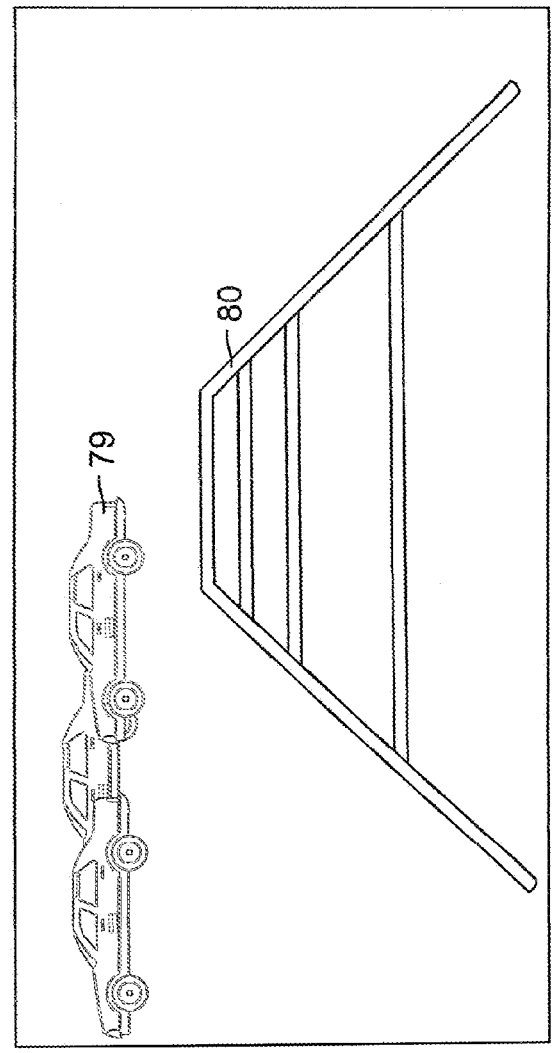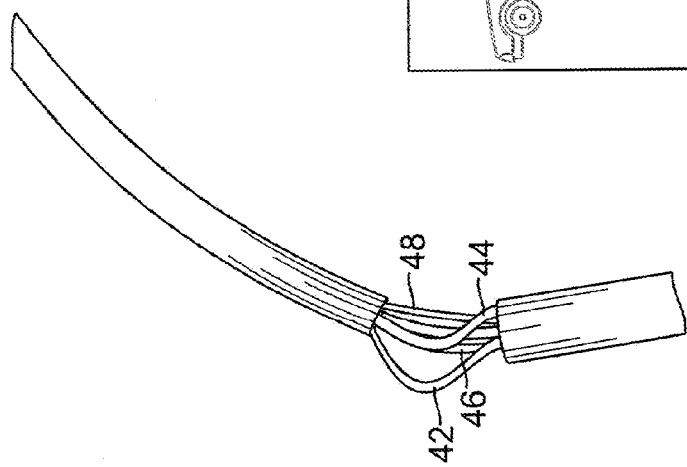

VEHICLE REAR VIEW CAMERA CONNECTING CABLE

BACKGROUND OF THE INVENTION

1. Field of the Invention

The present invention provides a cable system for connecting a rear view camera to the vehicle 12 volt DC system.

2. Description of the Prior Art

Rear view camera assemblies for use with vehicles have been disclosed in the prior art. For example, U.S. Pat. No. 8,432,446 to Son discloses a monitoring camera assembly which includes a camera portion and a rear housing. The camera portion for sensing image of a object behind a vehicle including a camera body, a camera lens, and two rotational axles. The rear housing is installed on the license plate and supports the camera body, a first mechanical fastening device for fastening the front housing to the license plate is provided.

The camera body and lens is secured to two front housings in a manner such that if the camera fails and needs to be replaced, a time consuming and costly effort is required. Further, the connector diameter is of a size that makes it difficult for a connection to be made from the vehicle rear view mirror to the rear view camera assembly. Further, the prior art typically uses a RCA connector having a diameter size of 12 mm and being adapted to connect only a video signal to the monitor.

What is desired is to provide a vehicle rear view camera assembly wherein a failed camera can be simply replaced without exchanging the entire wire harness and wherein the connector cable is relatively small in diameter.

SUMMARY OF THE INVENTION

The present invention provides a connector for connecting both a power source and the vehicle rear view mirror or dashboard monitor to a camera mounted to the rear end of a vehicle and positioned adjacent the vehicle license plate using a metal bracket. The size of the connector is significantly reduced from that available in the prior art which allows installers of the camera to easily form a small hole through the vehicle body and route the wire from the rear view mirror, or monitor, within the vehicle cabin to the camera.

This arrangement provided by the small diameter connector (typically 5 mm in diameter) cable enables a faulty camera to be easily removed and replaced with a cable that combines power and video lines (leads).

DESCRIPTION OF THE DRAWINGS

For a better understanding of the present invention as well as other objects and further features thereof, reference is made to the following description which is to be read in conjunction with the accompanying drawing therein:

FIG. 6 (a) illustrates connected wire pairs; FIG. 6 (b) illustrates disconnected wire pairs; and FIG. 6 (c) illustrates a conventional image for a rearview camera.

DESCRIPTION OF THE INVENTION

Figure 1:
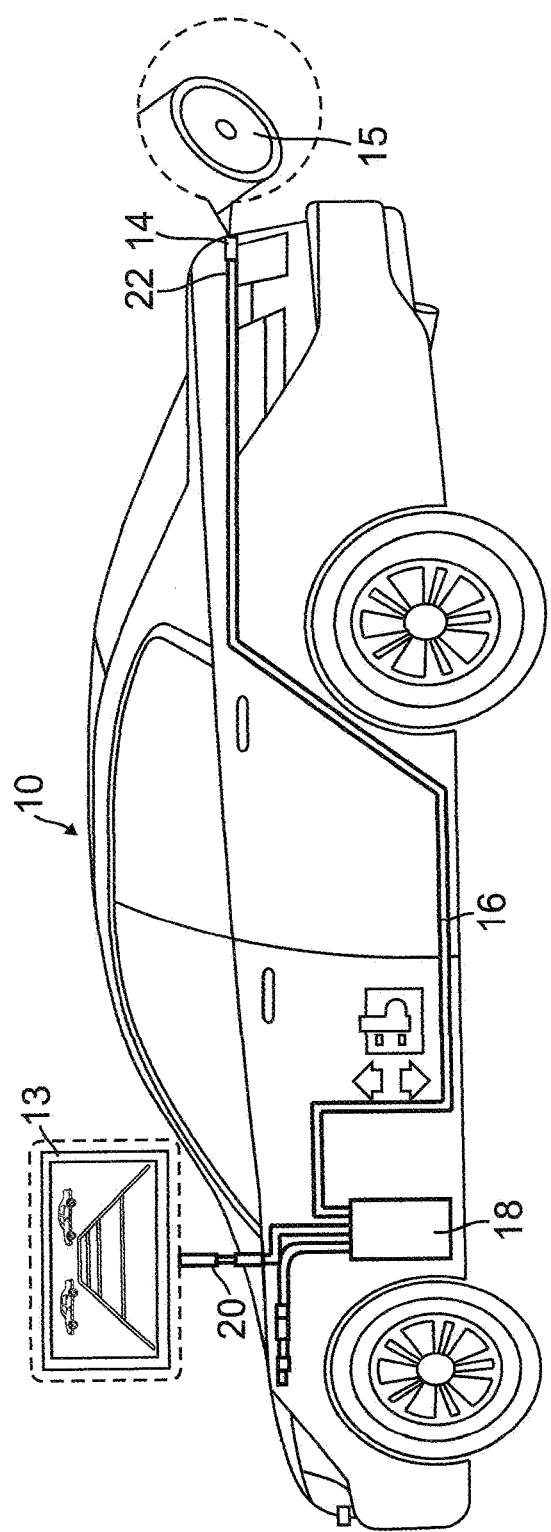
FIG. 1 is a simplified view of a vehicle wherein the connector system of the present invention is utilized.

Referring now to FIG. 1, a simplified representation of a modern vehicle 10 is illustrated. In this figure, a dashboard mounted monitor 13 is shown for illustrative purposes, outside the vehicle 10. The image shown on the screen on monitor 13 is provided by backup camera 14, the camera having a lens 15 (note that the vehicle rearview mirror can combine the conventional mirror function with display monitor 13 for use with backup rear view camera 14). In accordance with the teachings of the present invention, a smart cable 16, with combined power and video lines, connects 12 volt DC vehicle battery 18 to monitor portion 13 via lead 20 and connector 22. Portion 24 of cable 16 is utilized to couple battery 18 to both backup camera 14 and to couple the video images detected thereby to monitor 13, whether positioned on the dashboard or formed as part of the rearview mirror assembly.

Figure 2:
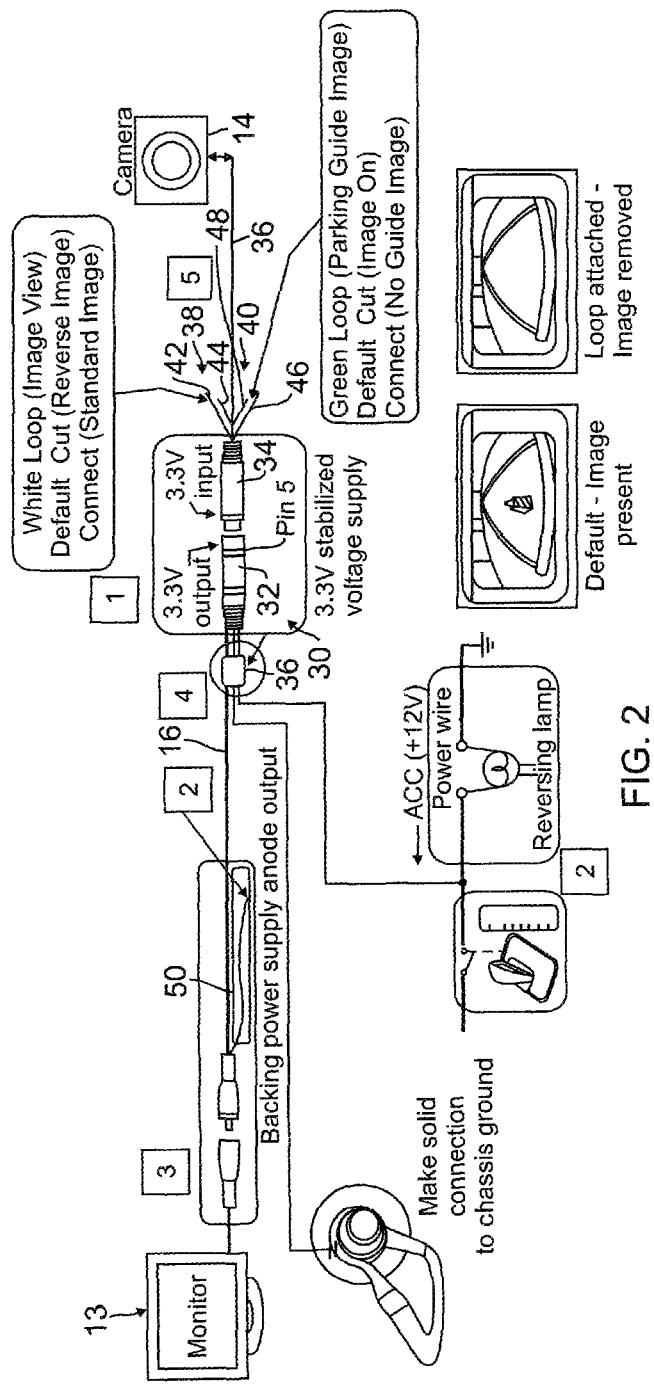
FIG. 2 is a simplified schematic illustrating how the rear view mirror is connected to the rear view camera.

FIG. 2 is a schematic illustrating the electrical connections provided by the cable 16 of the present invention. A connector 30 comprises a 3.3V output portion 32 (shown in more detail in FIG. 3) and a 3.3V input portion 34 (shown in more detail in FIG. 4). An in-line voltage reducer 36 provides a stabilized 3.3V DC voltage to drive camera 14 by reducing the 12V output from battery 18. The output cable portion 36 comprises two wire pairs, 38 and 40. Wire pair 38 provides the video signals to drive rearview mirror monitor 13 (or a monitor mounted on the vehicle dashboard). Pair 38 comprises leads 42 and 44 which are selectably connected together at the time camera 14 is installed. When the leads are disconnected, monitor 13 illustrates a reverse image; when connected together, a standard image is presented on monitor 13. Pair 40 comprises leads 46 and 48 which are selectably connected or disconnected at the time camera 14 is installed. When leads 46 and 48 are connected together, the standard parking guide image is not shown on monitor 13; when disconnected, the parking guide image is viewable on monitor 13.

Figure 3:
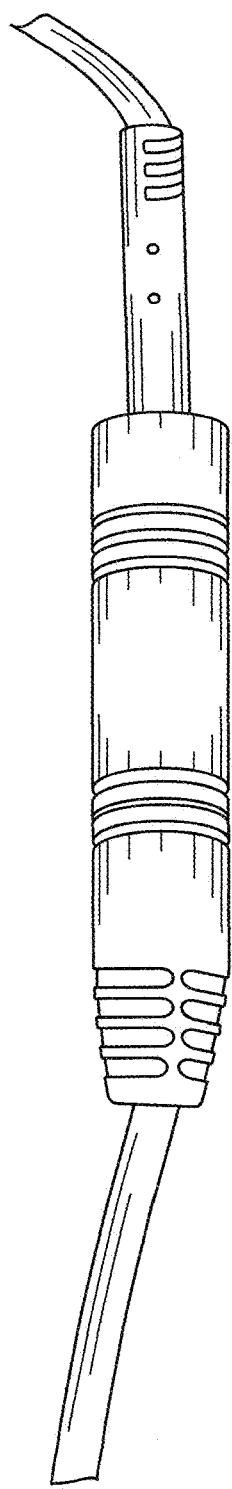
FIG. 3 is a view of the connector portions connected together.
Figure 4:
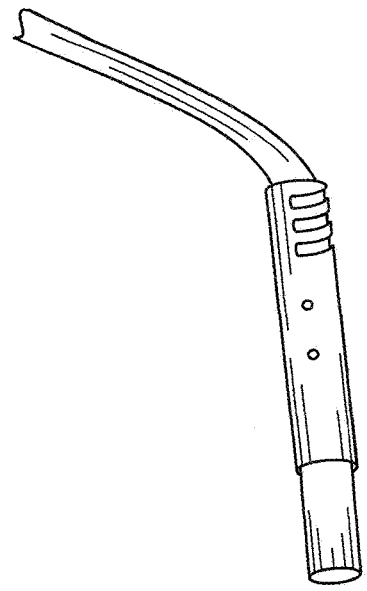
FIG. 4 is a view of the connector showing the two connector portions disconnected.
Figure 4:
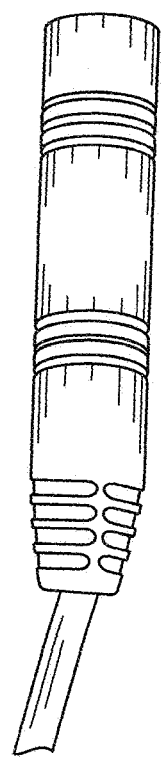

FIG. 3 is a view of the connector 30 (a mini DIN connector) with output portion 32 and input portion 34 connected together and FIG. 4 is a view of the camera input plug 34 (a mini DIN connector) spaced apart from output portion 32. Output portion 34 is connected to cable 50 (the standard DIN connector is an electrical cable that plugs into an interface to connect devices. It comprises multiple pins within a circular protective sheath; the Mini-DIN was developed to avoid possible misconnections to a mating component).

Figure 5:
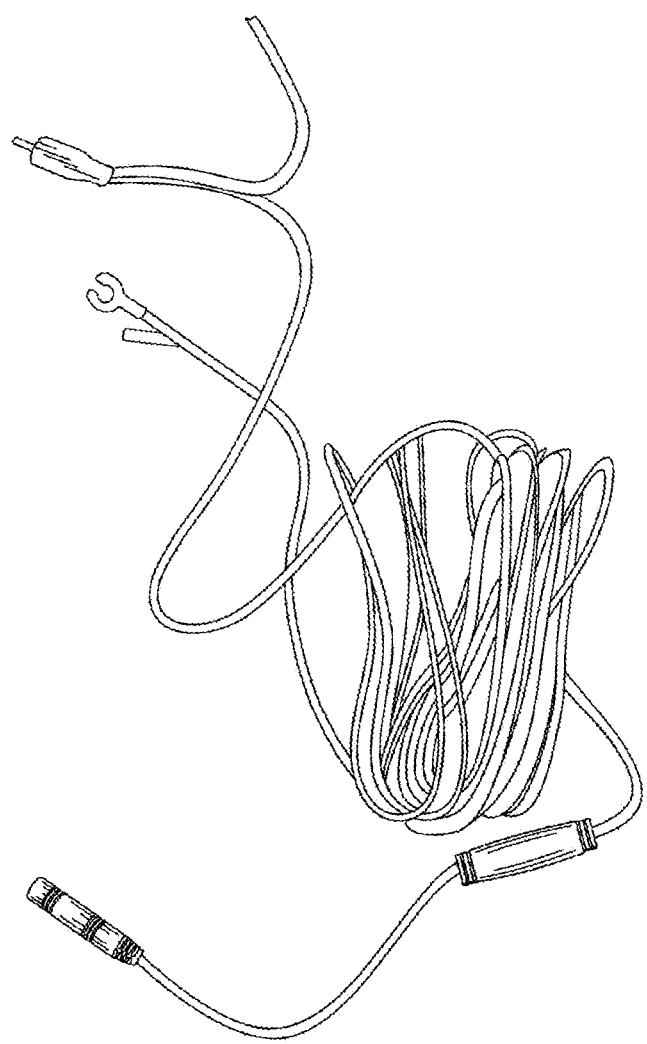
FIG. 5 illustrates the connector assembly of the present invention.

FIG. 5 is a perspective view of the connector assembly 60 of the present invention. Assembly 60 comprises an elongated wire harness 62 having lead 64 which connects camera 14 to monitor 13, a lead 66 connecting power wire 68 to monitor 13. Clip 70 is coupled to the vehicle battery 18, battery 18 powering monitor 13 and back-up camera 14 (via leads 16 and 22 as shown in FIG. 1).

FIG. 6(a) illustrates wires 42 and 44 of pair 38 and wires 46 and 48 of pair 36 connected together, the first pair connection enabling a standard image 79 to appear on monitor 13, the conventional rearview image 80 (shown in FIG. 6(c)) not appearing (note this occurs when the vehicle gear is in the reverse position). When the wires in pairs 36 and 38 are not connected as shown in FIG. 6(b), the image shown in FIG. 6(c) appears on the screen of monitor 13. When the vehicle gear is not in reverse, the monitor shows a blank image.

The camera 14 is preferably mounted either on the bottom side of the vehicle trunk lid or on the face side of the rear trunk lid. The camera can be secured to the lid using a double sided adhesive tape or by drilling into the deck lid with short sheet material screws.

As noted hereinabove, monitor 13 can be part of a rearview mirror system which also incorporates a standard rearview mirror. An example of this is shown in U.S. Pat. No. 8,717,521 issued on May 6, 2014 to Philip Maeda, the teachings thereof necessary for an understanding of the present invention being incorporated herein by reference.

The cable described hereinabove is considered "smart" in that it incorporates power and ground leads (lines) which are activated when the vehicle is in reverse gear (or when the reverse lights are on), a video connector and a trigger line to connect monitor (display unit) 13. The video and power signals are provided to monitor 13 via a single cable line.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A cable connecting a monitor that is installed in the interior of a vehicle to a camera mounted on the vehicle exterior, the vehicle having a rearview mirror and dashboard, comprising:
   a connector for joining two portions of the cable together, the connector having at least first and second lead pairs; and
   means for connecting or disconnecting said lead pairs, connecting said lead pairs causing the image appearing on said camera also to appear on said monitor, disconnecting said lead pairs preventing an image appearing on said camera from appearing on said monitor.

2. The cable of claim 1 wherein said monitor is formed as part of said rearview mirror.

3. The cable of claim 1 wherein said monitor is mounted on said vehicle dashboard.

4. The cable of claim 1 wherein said connector includes means for transmitting power and video signals to said monitor.

* * * * *